(12) United States Patent
Boss et al.

(10) Patent No.: US 8,738,430 B2
(45) Date of Patent: May 27, 2014

(54) ENVIRONMENTALLY RESPONSIVE SHIPPING SELECTION

(75) Inventors: Gregory J. Boss, American Fork, UT (US); Lamont U. Cannon, Durham, NC (US); Rick A. Hamilton, II, Charlottesville, VA (US); Ruthie D. Lyle, Durham, NC (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 1085 days.

(21) Appl. No.: 12/271,301

(22) Filed: Nov. 14, 2008

(65) Prior Publication Data

US 2010/0125494 A1 May 20, 2010

(51) Int. Cl.
*G06Q 30/00* (2012.01)
*G06Q 90/00* (2006.01)

(52) U.S. Cl.
CPC ..................................... *G06Q 90/00* (2013.01)
USPC ........................................................ 705/14.1

(58) Field of Classification Search
CPC ..................................................... G06Q 90/00
USPC .......................................................... 705/14.1
See application file for complete search history.

(56) References Cited

U.S. PATENT DOCUMENTS

| | | | |
|---|---|---|---|
| 6,970,855 B2 | 11/2005 | Das et al. | |
| 7,136,830 B1 | 11/2006 | Kuelbs et al. | |
| 2002/0046131 A1 | 4/2002 | Boone et al. | |
| 2003/0217018 A1 | 11/2003 | Groff et al. | |
| 2007/0073551 A1 | 3/2007 | Williams et al. | |
| 2007/0106781 A1 | 5/2007 | Hancock et al. | |
| 2008/0010223 A1 | 1/2008 | Hoffman et al. | |
| 2008/0015882 A1 | 1/2008 | Frederick | |
| 2009/0210313 A1* | 8/2009 | Winebrake et al. | 705/26 |

* cited by examiner

*Primary Examiner* — Daniel Lastra
(74) *Attorney, Agent, or Firm* — Patrick J. Daugherty; Driggs, Hogg, Daugherty & Del Zoppo Co., LPA (57) ABSTRACT

Methods, devices and systems are provided for enabling the selection of a shipping option responsive to an environmental preference. A user indicates a shipping criteria preference including an environmental impact weighting. A cost value of each of a plurality of shipping options is determined including an environmental impact cost. A shipping options is selected and implemented for a shipping of an item as a function of the indicated environmental impact weighting. Each of the plurality of shipping option cost values may be dynamically recalculated and the status of at least one of the shipping options updated, the updating determining a change in value a shipping option cost value, an implemented selected shipping option changed to another of the plurality of shipping options as a function of the status updating.

24 Claims, 3 Drawing Sheets

ENVIRONMENTALLY RESPONSIVE SHIPPING SELECTION

FIELD OF THE INVENTION

The present invention generally describes methods, systems and devices for enabling consumers to select shipping options responsive to environmental impact data and parameters.

BACKGROUND OF THE INVENTION

Shoppers may be offered multiple shipping options for an order, with each of the options commonly differentiated with respect to cost and speed of delivery. However, consumers may wish to base their shipping decisions upon other factors. For example, consumers may wish to determine and consider the relative environmental impacts or costs of shipping options, in some instances opting for slower and/or more expensive shipping options in exchange for environmental impact cost reductions.

In another aspect, information on shipping option costs and attributes are generally provided by shipping cost and rate algorithms using predetermined, preset and/or static input data to produce cost or time estimates as a function of order attributes (such as item weight and size). Such data and algorithms are not responsive to changing conditions that may affect the actual cost or speed or other attribute of a given shipping option.

SUMMARY OF THE INVENTION

Methods are provided for enabling the selection of a shipping option responsive to an environmental preference. More particularly, a user of the method indicates a shipping criteria preference, the preference including an environmental impact weighting. According to the present invention a cost value of each of a plurality of shipping options is determined, each of the plurality of shipping option cost values including an environmental impact cost. One of the presented plurality of shipping options is selected and implemented for shipping of an item as a function of the indicated environmental impact weighting. In another aspect each of the plurality of shipping option cost values are dynamically recalculated and the status of at least one of the shipping options updated, the updating determining a change in value a shipping option cost value, wherein an implemented selected shipping option may be changed to another of the plurality of shipping options as a function of the status updating.

In another aspect, service methods are provided comprising deploying applications for enabling the selection of a shipping option responsive to an environmental preference according to the method steps described above, for example by a service provider who offers to implement, deploy, and/or perform functions for others. Still further, articles of manufacture comprising a computer usable medium having a computer readable program in said medium are provided. Such program code comprises instructions which, when executed on a computer system, cause the computer system to perform one or more method and/or process elements described above for enabling the selection of a shipping option responsive to an environmental preference. Moreover, systems, articles and programmable devices configured for performing one or more method and/or process elements of the current invention are also provided for enabling the selection of a shipping option responsive to an environmental preference, for example as described above.

BRIEF DESCRIPTION OF THE DRAWINGS

These and other features of the methods, systems and devices according to the present application will be more readily understood from the following detailed description of the various aspects of the embodiments taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience the Detailed Description of the Invention has the following sections:
I. General Description; and
II. Computerized Implementation.

I. General Description

The present application discloses systems, methods, devices and program products for enabling the selection of a shipping option responsive to an environmental preference. In some embodiments a shipping service requester or user is enabled to select environmentally sensitive shipping options for a shipped item. Examples of users include consumers in a business-to-consumer scenario with an on-line retailer or wholesaler customers purchasing products from e-commerce sites, as well as buyers representing one or more corporate entities in business-to-business purchasing contexts, and other appropriate examples will be apparent to one skilled in the art. Real-time route tracking and maintenance may automatically recalculate cost, time and environmental impact in the case of an unexpected event, in one aspect allowing a user to make decisions during shipping to maintain environmental criteria.

Though it is known to offer shipping service users multiple options for shipping an order differentiated by price or speed of delivery, no prior art system or method teaches differentiating shipping options, and enabling users to responsively select shipping options, based on environmental impacts. More particularly, e-commerce sites generally use preset shipping rates based on product attributes such as weight and size, and do not query shipping providers for real-time quotes during the customer check-out process. The present invention extends shipping selection criteria into environmental impact costs through incorporating real-time shipping provider cost estimate queries into the shipping selection process, in some embodiments by putting a shipping job out to bid to multiple shipping providers in real-time during a customer check-out process.

Figure 1:
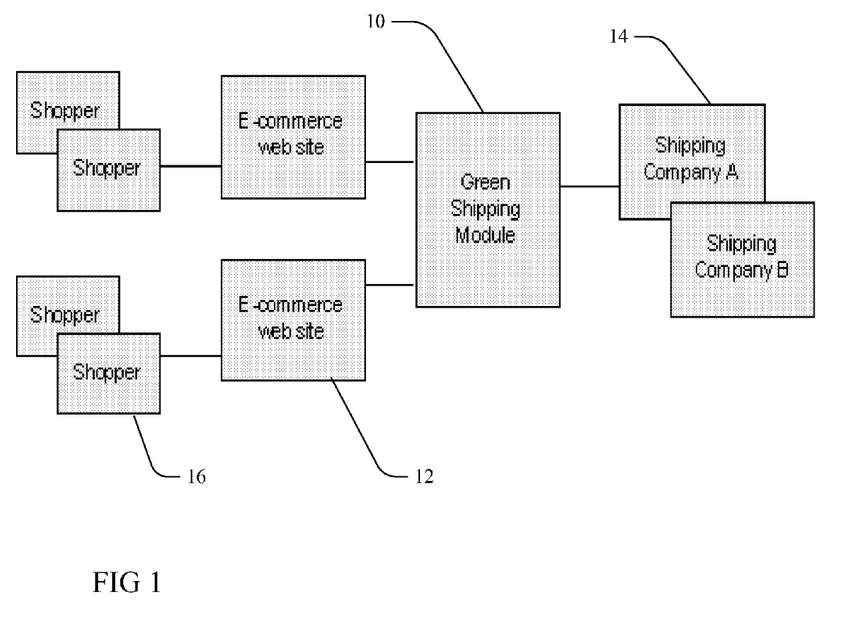
FIG. 1 is block illustration of an implementation of a Green Shipping Module according to the present invention.

For example, FIG. 1 illustrates one embodiment of the present invention wherein a Green Shipping Module (GSM) 10 interfaces between vendors 12 and shipping companies 14, acting as middleman between the plurality of vendors 12 and shipping companies 14 in selecting and implementing the shipping of items for one or more users (shoppers) 16. It will also be appreciated that in other embodiments the GSM 10 may be associated with one or more particular vendors 12 and shipping companies 14. Some GSM 10 embodiments includes the use of Hypertext Mark-up Language (HTML), Extensible Mark-up Language (XML) or other code buttons pasted into a web page of an e-commerce website, wherein when a user of said website wishes to finalize an order the user clicks on or otherwise selects the code button and is then transported to an ordering system of the GSM 10 to complete the transaction and implement shipping.

Consumers and other shipping users are becoming more environmentally conscious, yet prior art shipping methods and systems are not responsive to this issue. It is possible to measure the environmental impact of shipping items, including determining a "carbon footprint" of making and shipping certain products. A carbon footprint may be defined as a measure of the impact an activity has on the environment, and in particular with regard to the amount of greenhouse gases produced in burning fossil fuels for electricity, heating and transportation, etc., in effecting the activity. Greenhouse gases are believed to impact the environment through causing climate change, and thus it has become known to quantify the carbon footprint of an activity as the measurement of greenhouse gases produced, typically as an equivalent of carbon dioxide gases generated in units of tons or kilograms. More particularly, systems and methods according to the present invention enable a user to specify and enable the selection of an environmentally-friendly shipping option, for example by comparing the carbon footprints of each of a plurality of shipping options and selecting an option having a relatively lower or lowest carbon footprint.

Figure 2:
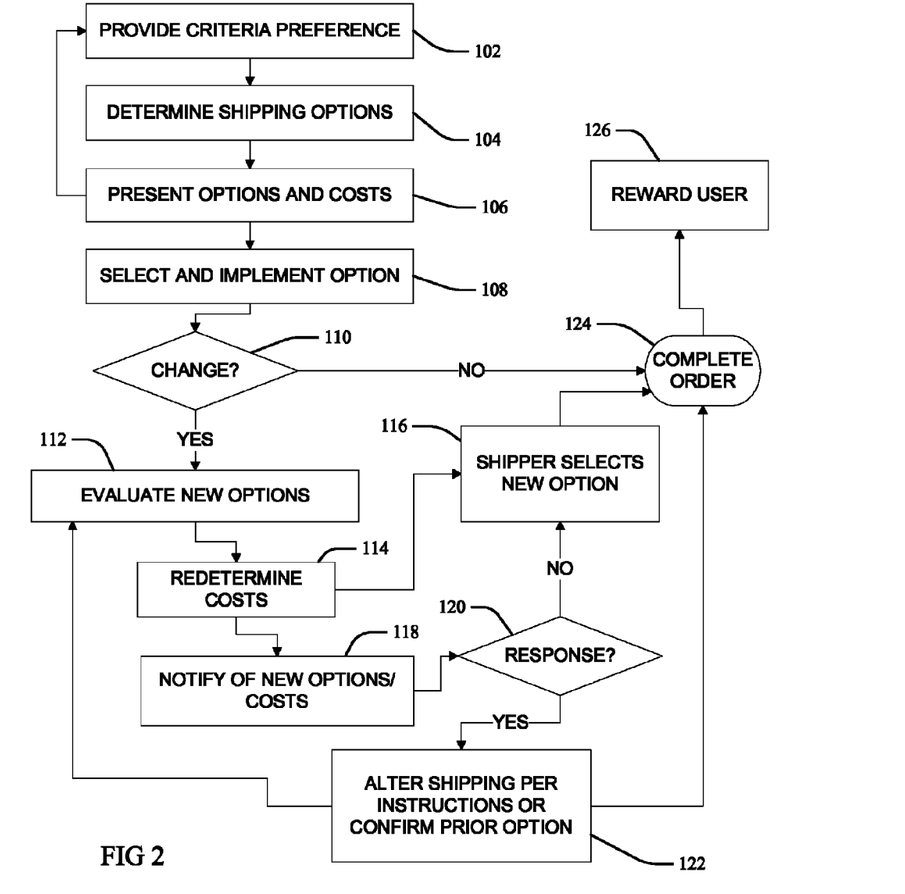
FIG. 2 is a flow chart illustrating a method and system for enabling the selection of a shipping option responsive to an environmental preference according to the present invention.

Referring now to FIG. 2, a method or system for enabling the selection of a shipping option responsive to an environmental preference according to the present invention is illustrated. At 102 a user indicates a shipping criteria preference, the preference including an environmental impact weighting. The indication may comprise one or more priorities in terms of price, time-to-deliver and environmental impact. Thus, some shipping may be designated as "green shipping" options, wherein a green shipping option has a lower environmental impact cost relative to another non-green shipping option. The environmental impact criteria may be expressed in many ways, with some examples including a binary selection (e.g., an indication to consider a green option or to not consider such an option), or a continuum or sliding scale (e.g. manipulating a sliding bar means to indicate a relative level of green consideration along a spectrum of possible levels).

Specific values, or ranges or thresholds of values (for example, maximum or minimum possible values or ranges thereof) of shipping option carbon footprint values may also be provided at 102, thus specifying the inclusion or exclusion of one or more shipping options inside or outside of specified values, thresholds or ranges. In another embodiment a user ranks, weights or orders a set of available criteria with respect to relative application or importance. Thus, in a ranked or weighted factor embodiment comprising a set of price, environmental impact and time-to-delivery factors, a first user may rank the factors with "lowest price" the first and most heavily weighted factor, "lowest environmental impact" as second in relative importance or weighting, and "fastest delivery time" as the third and relatively least important or weighted factor, in contrast, another second user may order them differently, selecting "lowest environmental impact" first, "fastest delivery time" second and "lowest cost" third.

At 104 a cost value of each of a plurality of identified shipping options are determined, for example through the Green Shipping Module (GSM) 10 of FIG. 1, wherein each of the cost values includes an environmental impact cost for each respective shipping option, the criteria supplied by the user at 102 further used to determine possible shipping options. In some embodiments, cost values are calculated at 104 as a function of an environmental impact weighting indicated at 102, and in some examples shipping options are ranked and/or select as a function of indicated weightings. At 108 one of the plurality of options is selected and implemented for shipping an item. This selection may occur automatically, for example as a function of an indicated preference or impact weighting value selection. Or it may be manually entered by a user presented with a display of options at 106, for example from a list ranked as function of the indicated weighting. A user may also manually override an automatic selection indicated at 106. However, it will be understood that displaying one or more possible shipping options to a user at 106 is optional, and this may be omitted in some embodiments.

It is to be understood that if trade-offs must be made among multiple criteria, in some cases not all criteria may be met perfectly in determining options and costs at 104, presenting options at 106 or selecting options at 108. For example, if no shipper is able to satisfy a user-specified criteria (for example, as specific weighting of low price, fast delivery and low environmental impact) then recommendations may be made for a best-possible option based on said unsatisfied specification or priorities. Embodiments may also prevent users from inputting invalid specification combinations, for example rejecting a given carbon footprint, cost and delivery time value selection if no shipping provider can meet the selection.

In another aspect, shipping options may be determined at 104 based on static variables set for ordered criteria and applied to previously identified or known services. Static variables available for criteria ordering 102 may thus be applied to previously identified services at 104 wherein shipping price, time and projected environmental impact values are determined based on information already known and stored by an e-commerce site or Green Shipping Module (GSM) 10 (FIG. 1).

In some embodiments, shipping options may be determined dynamically at 104, for example a Green Shipping Module 10 (FIG. 1) querying the one or more shipping providers 14 (FIG. 1). Thus, a web service may be used to query shipping companies to display their best option for parameters given (as provided at or derived from the criteria supplied by the user at 102). In another aspect, dynamic calculation may be extended by providing for an extended time for response from the shipping entities: for example, if the user is willing to wait some specified time period after an initial calculation and return of shipping options at 104 for updated data, then it may be discovered that one shipping provider has newly identified a truck with available capacity, wherein using that newly-identified truck capacity may result in a lowered carbon footprint relative to other shipping options, and thus a lower carbon footprint may be achieved in shipping the item by selecting the newly-discovered and updated option.

In some embodiments, shipping options may be determined dynamically at 104 by putting a delivery service request out to bid to a plurality of shipping providers, for example by the Green Shipping Module (GSM) 10 (FIG. 1) to the shippers 14 (FIG. 1). This embodiment enables delivery services to "bid" based on price, environmental impact and delivery time with each transaction. Such point-in-time bids may also provide data for shipping options formatted for direct presentation to the user, in some examples with price quotes passed directly through to the user through an e-commerce checkout or item purchase page on a retailer web page. In another aspect, an item provider or website may also preemptively request a price or bid for a pending order during or prior to a checkout process, in this fashion obtaining a bid for immediate offer to a purchaser at checkout or when the purchaser otherwise indicates that he or she is ready to complete the business transaction.

In another aspect, incentives may also be offered to a user in presenting options at 106 in order to induce a user to select a specific shipping offer, for example to select or prefer a green shipping option, merchant or shipping company over another, less-costly option. Incentives may be monetary or non-monetary, as well as offered and granted on-the-spot at a selection at 108, or subsequently at completion of shipping of an item, for example at 126 discussed below.

At 110 the status of the shipped item, as well as the cost values of one or more of the offered shipping options, are dynamically ascertained, updated and recalculated, and it is determined whether a change in the item shipping status or a shipping item cost value has occurred. If no change in a cost or shipping status is determined, or no change occurs greater than a minimum or de minimis delta or threshold value used to define a change event occurrence, then the selected shipping option implementation continues until the shipping of the item is complete at 124. However, if a change is determined at 110, then at 112 a plurality of shipping options currently available are identified and at 114 the associated cost values of each of the current plurality, as well as of the present implemented shipping option, are each determined or re-determined, each of the shipping option cost values again including an environmental impact cost for each respective shipping option.

More particularly, tracking at 110 of an item progressing through a shipping option selected and implemented at 108 comprises determining updates or changes to environmental impact costs and factors relevant to shipping of the item. Thus, a user may be notified of changes in plans for shipping the package, for example due to a change in fuel supply or an availability within a particular transport system, including a resultant change in the environmental impact costs or benefits of the implemented (or other available and non-implemented) shipping option. In some embodiments, service providers may use a tracking interface to advertise green shipping impact, history, philosophy, etc. data and information to a user in hopes of incenting the user to retain the service provider.

Many parameters useful in determining an environmental impact of shipping an item from one location to another are dynamic in nature, and further dependent upon real-time, variable conditions, including weather, supply, demand, natural disasters, etc. In one aspect the present invention enables users, shipping providers or consumers to dynamically modify shipping options to account for changing conditions. Thus, if a change in shipping option costs or performance parameters is determined at 110, then new shipping options are evaluated and determined at 112 and the cost values of each are determined or re-determined at 114. In some embodiments, a shipper, shipping service or automated process (for example a GSM 10 of FIG. 1) may automatically make an appropriate shipping selection revision or choice at 116 in response to the criteria provided earlier at 102, and shipping of the item may be completed accordingly at 124. Thus, in one example, a shipping option available and ranked next-best pursuant to rankings or priorities provided at 102 is selected and implemented at 116.

In some embodiments, a user may also be notified of the change in options and costs at 118 and presented with another shipping selection option, or criteria input or revision opportunity. Thus, the user may then respond at 120, for example confirming a current, previously selected shipping option, selecting and implement a new option presented at 116, and further in some cases inputting a new ranking or priority preference in order to generate another evaluation of options at 112, cost determination at 114 and notification/display of options at 116. Shipping of the item is completed accordingly at 124. If no response is received at 118 from the user notification at 116, then at 122 the present embodiment defaults to a shipper, shipping service or automated process (for example a GSM 10 of FIG. 1) automatically making an appropriate shipping selection revision or choice at 116.

Thus, in one example, a severe weather situation occurrence may cause a shipping service provider to choose whether to (a) consume a larger carbon footprint in rerouting a truck carrying a shipped item; (b) move the item to an airplane in an alternate shipping mode choice, this option having a different carbon footprint, monetary and/or delivery time cost; or (c) leave the item on the truck and delay shipment until the weather condition has abated, thus increasing delivery time while holding carbon footprint and monetary costs constant relative to option (a). The consumer/user may thus be contacted at 118 and queried as to which option should be implemented, for example being notified that selection of option (c) will result in a one-day delivery time delay but at the lowest carbon footprint cost relative to options (a) or (b), and wherein electing option (b) will reroute and deliver the item on-time at an additional cost of two dollars (US$2.00).

In another aspect, users may be rewarded for making appropriate shipping preferences and choices with respect to environmental impacts and other characteristics. Accordingly, at 126 a user may be provided with a reward amount as a function of selecting shipping choices having relatively lower or beneficial environmental impact costs. Thus, in one example, a benefit rewarded at 126 is calculated as a function of the net difference of an environmental impact of a chosen shipping option over one or more faster or cheaper but more environmentally costly options offered at 106 or 118.

Long-term incentives may also be offered for electing to use green shipping options according to the present invention, wherein tracking mechanisms, including cookies and saved user settings may be read by an e-commerce or shipping server provider site to maintain a history of the consumer's green shipping habits, and wherein rewards may be responsively provided to a user at 126 at the completion of each shipping transaction. Incentives provided for current or past/historic green shipping selections may include discounts on goods or services, designation of a special preferential status relative to other not-so-green users and customers, advertisement or other public notice of the user's environmentally-friendly behavior, coupons, points that may be redeemed for goods or services, and offers for special sales and events correlated with an optimized "green shipping periods," and still other incentives and rewards will be apparent to one skilled in the art.

Figure 3:
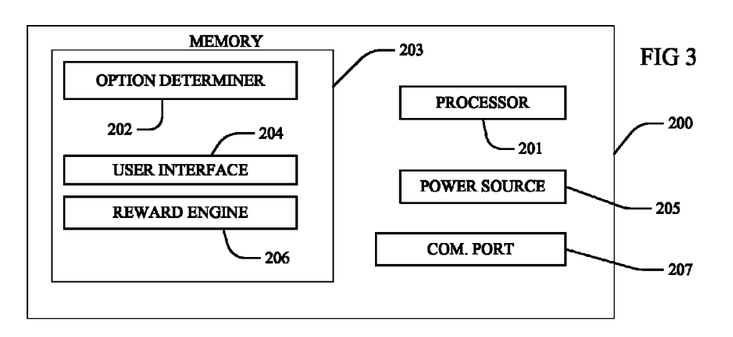
FIG. 3 is a block diagram of a system or device configured to enable the selection of a shipping option responsive to an environmental preference according to the present invention.

FIG. 3 illustrates a programmable device or module 200 configured to enable the selection of a shipping option responsive to an environmental preference according to the present invention. The device 200 may be incorporated into a large system wherein other components of the system accomplish systems and methods according to the present invention, or it may be a stand-alone device or module configured to perform each of the systems and methods, such as the Green Shipping Module (GSM) 10 of FIG. 1. The present embodiment comprises a central processing unit (CPU) or other processing means 201 in communication with a memory 203, the memory 203 comprising logic components that enable the CPU 201 to perform processes and methods according to the present application. The memory 203 comprises a shipping option determiner logic component 202, the determiner configured to determined costs associated with each option as discussed above with respect to FIGS. 1 and 2; a user interface logic component 204, configured to interact with a user by providing notifications of shipping options, costs, changes, etc., and to receive criteria and selection inputs from the user as discussed above with respect to FIGS. 1 and 2; and a reward engine logic component 206, configured to directly or indirectly cause the awarding of incentives to a user, for example through exchanging reward data with an external reward service entity, and further as discussed above with respect to FIGS. 1 and 2. A power unit 205 is configured to provide operative power to the device 200; examples include battery units 205 and power inputs configured to receive alternating or direct current electrical power, and other appropriate power units 205 will be apparent to one skilled in the art. A communication port or network link/node means 207 is also provided and configured to enable network and other communications with other devices, systems, monitoring, administrative and service provider entities, as well as others as appropriate.

II. Computerized Implementation

Figure 4:
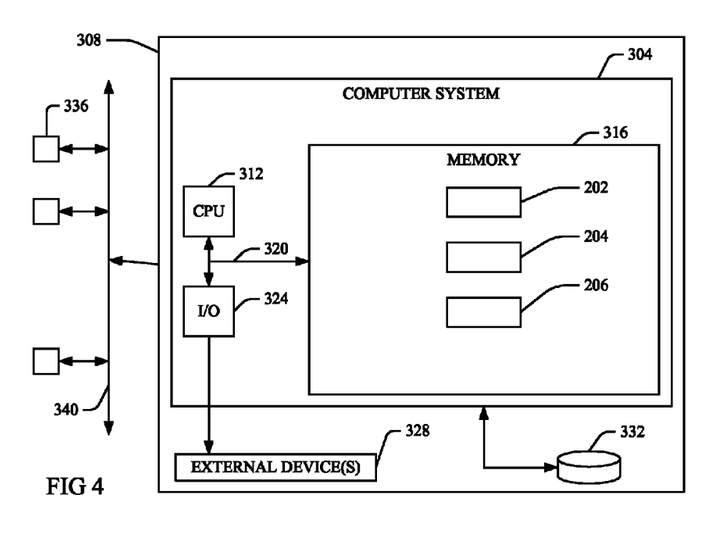
FIG. 4 is a block diagram illustrating a computerized device implementation of a method and system for enabling the selection of a shipping option responsive to an environmental preference according to the present invention.

Referring now to FIG. 4, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and systems, and devices as illustrated in FIGS. 1-3 and described above, including the shipping option determiner logic component 202, the user interface logic component 204, and the reward engine logic component 206 discussed above, which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 4 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement methods, systems and devices according to the present application, for example as illustrated in FIGS. 1-4 above and described otherwise herein. To this extent, the computer-readable/useable medium includes program code that implements each of the various process steps of the present application.

It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network (e.g., during a wired/wireless electronic distribution of the program code).

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for enabling the selection of a shipping option responsive to an environmental preference, comprising:
    selecting and implementing via a central processing unit a highest ranked one of a first ranked plurality of shipping options for a shipping of an item, wherein the plurality of shipping options are ranked in a first ranking as a function of shipping option cost values determined for each of the shipping options from environmental impact costs, shipping price costs and time-to-delivery costs;
    dynamically recalculating the determined cost values of at least one of the plurality of shipping options during a shipping of the item by the implemented highest ranked one of the first ranked plurality of shipping options;
    updating via the central processing unit the ranking of the plurality of shipping options to generate a second ranking of the shipping options that is different from the first ranking in response to a change in value of the recalculated at least one shipping option cost values; and
    changing via the central processing unit the implemented selected shipping option during the shipping of the item from the highest ranked one of the first ranking to another of the plurality of shipping options that is ranked higher in the second updated ranking.

2. The method of claim 1, further comprising at least one of:
    notifying a user of the change in value of the at least one of the determined shipping option cost values;
    presenting the updated second ranking of the plurality of shipping options to the user; and
    enabling the user to manually change the selected and implemented shipping option during the shipping of the item to the another of the presented shipping options in the updated second ranking of the plurality of shipping options.

3. The method of claim 2, wherein the updating via the central processing unit the ranking of the plurality of shipping options to generate the second ranking of the shipping options further comprises:
    providing for an extended time period for responses of shipping option cost values from shipping option entities after an initial calculation and return of the first ranking of the shipping options;
    discovering during the extended time period that the another shipping option has newly available capacity for shipping the item;
    determining that using the newly available capacity in the another shipping option results in a lower environmental impact cost for the shipping the item than using the selected and implemented shipping option; and
    ranking the another shipping option higher than the selected and implemented shipping option in the updated second ranking in response to determining the lowered environmental impact cost for the shipping the item using the newly available capacity.

4. The method of claim 3, further comprising:
    tracking a progression of the item through the selected and implemented shipping option;
    determining changes to environmental impact costs relevant to shipping of the item in response to a change in fuel supply or a change in availability within a transport system of the selected and implemented shipping option;
    informing the user of the determined changes to the environmental impact costs; and enabling the user to retain the selected and implemented shipping option in response to the information of the determined changes to the environmental impact costs, instead of switching to the another option that is ranked higher in the second rankings.

5. The method of claim 4, further comprising:

presenting the plurality of the shipping options to the user by presenting bids provided by at least one shipping vendor in response to a real-time query.

6. The method of claim 4, further comprising:

calculating a reward amount as a function of a weighting value of a user-indicated shipping preference environmental impact weighting or as a function of an environmental impact cost value of a one of the plurality of shipping options manually selected by the user; and providing the calculated reward amount to the user.

7. The method of claim 6, wherein the calculating and providing the reward amount comprises calculating and providing a long-term incentive as function of the user historically selecting shipping options with low environmental impacts on a plurality of historic item orders, the incentive at least one of a monetary value, a discount on offered items and a point value redeemable for goods or services.

8. A service for enabling the selection of a shipping option responsive to an environmental preference, comprising:

providing a computer infrastructure that:

selects and implements a highest ranked one of a first ranked plurality of shipping options to effect a shipping of an item, wherein the plurality of shipping options are ranked in a first ranking as a function of shipping option cost values determined for each of the shipping options from environmental impact costs, shipping price costs and time-to-delivery costs;

dynamically recalculates at least one of the plurality of shipping option determined cost values during the shipping of the item by the implemented highest ranked one of the first ranked plurality of shipping options;

updates the ranking of the plurality of shipping options to generate a second ranking of the shipping options that is different from the first ranking in response to a change in value of the recalculated at least one shipping option cost values; and changes the implemented selected shipping option during the shipping of the item from the highest ranked one of the first ranking to another of the plurality of shipping options that is ranked higher in the second updated ranking.

9. The service of claim 8, wherein the computer infrastructure further:

notifies a user of the change in value of the at least one of the determined shipping option cost values and of the updated second ranking of the presented plurality of shipping option; and enables the user to manually change the selected and implemented shipping option during the shipping of the item to the another of the plurality of shipping options presented in the updated second ranking through an input to the computer infrastructure.

10. The service of claim 9, wherein the computer infrastructure further updates the ranking of the plurality of shipping options to generate the second ranking of the shipping options by:

providing for an extended time period for responses of shipping option cost values from shipping option entities after an initial calculation and return of the first ranking of the shipping options;

discovering during the extended time period that the another shipping option has newly available capacity for shipping the item;

determining that using the newly available capacity in the another shipping option results in a lower environmental impact cost for the shipping the item than using the selected and implemented shipping option; and ranking the another shipping option higher than the selected and implemented shipping option in the updated second ranking in response to determining the lowered environmental impact cost for the shipping the item using the newly available capacity.

11. The service of claim 10, wherein the computer infrastructure further:

tracks a progression of the item through the selected and implemented shipping option;

determines changes to environmental impact costs relevant to shipping of the item in response to a change in fuel supply or a change in availability within a transport system of the selected and implemented shipping option;

informs the user of the determined changes to the environmental impact costs; and enables the user to retain the selected and implemented shipping option in response to the information of the determined changes to the environmental impact costs, instead of switching to the another option that is ranked higher in the second rankings.

12. The service of claim 11, wherein the computer infrastructure further presents the plurality of the shipping options to the user by presenting bids provided by at least one shipping vendor in response to said real-time query.

13. The service of claim 10, wherein the computer infrastructure further:

calculates a reward amount as a function of a weighting value of an indicated shipping preference environmental impact weighting or as a function of an environmental impact cost value of a one of the plurality of shipping options manually selected by the user; and provides the calculated reward amount to the user.

14. The service of claim 13, wherein the computer infrastructure further calculates and provides the reward amount by calculating and providing a long-term incentive as function of the user historically selecting shipping options with low environmental impacts on a plurality of historic item orders, the incentive at least one of a monetary value, a discount on offered items and a point value redeemable for goods or services.

15. An article of manufacture, comprising:

a storage device comprising computer executable program code stored thereon, the program code comprising instructions which, when executed on a computer system, cause the computer system to:

select and implement a highest ranked one of a first plurality of shipping options to effect a shipping of an item, wherein the plurality of shipping options are ranked in a first ranking as a function of shipping option cost values determined for each of the shipping options from environmental impact costs, shipping price costs and time-to-delivery costs;

dynamically recalculate the at least one of the plurality of shipping option determined cost values during a shipping of the item by the implemented highest ranked one of the first ranked plurality of shipping options;

update the ranking of the shipping options to generate a second ranking of the shipping options that is different from the first ranking in response to a change in value of the recalculated at least one of the determined shipping option cost values; and change the implemented selected shipping option during the shipping of the item from the highest ranked one of the first ranking to another of the plurality of shipping options that is ranked higher in the second updated ranking.

16. The article of manufacture of claim 15, the program code comprising instructions which, when executed on the computer system, causes the computer system to:

notify a user of the change in value of the at least one of the determined shipping option cost values and of the updated second ranking of the presented plurality of shipping option; and enable the user to manually change the selected and implemented shipping option during the shipping of the item to the another of the plurality of shipping options presented in the updated second ranking through an input to the computer system.

17. The article of manufacture of claim 16, the program code comprising instructions which, when executed on the computer system, causes the computer system to update the ranking of the plurality of shipping options to generate the second ranking of the shipping options by:

providing for an extended time period for responses of shipping option cost values from shipping option entities after an initial calculation and return of the first ranking of the shipping options;

discovering during the extended time period that the another shipping option has newly available capacity for shipping the item;

determining that using the newly available capacity in the another shipping option results in a lower environmental impact cost for the shipping the item than using the selected and implemented shipping option; and ranking the another shipping option higher than the selected and implemented shipping option in the updated second ranking in response to determining the lowered environmental impact cost for the shipping the item using the newly available capacity.

18. The article of manufacture of claim 17, the program code comprising instructions which, when executed on the computer system, causes the computer system to:

track a progression of the item through the selected and implemented shipping option;

determine changes to environmental impact costs relevant to shipping of the item in response to a change in fuel supply or a change in availability within a transport system of the selected and implemented shipping option;

inform the user of the determined changes to the environmental impact costs; and enable the user to retain the selected and implemented shipping option in response to the information of the determined changes to the environmental impact costs, instead of switching to the another option that is ranked higher in the second rankings.

19. The article of manufacture of claim 17, the program code comprising instructions which, when executed on the computer system, causes the computer system to:

calculate a reward amount as a function of a weighting value of an indicated shipping preference environmental impact weighting or as a function of an environmental impact cost value of a one of the plurality of shipping options manually selected by the user; and provide the calculated reward amount to the user.

20. A programmable device comprising:

a processing means;

a memory in communication with the processing means comprising a logic component; and a network interface in communication with the processing means and the memory;

wherein the processing means is configured to:

select and implement a highest ranked one of a first plurality of shipping options to effect a shipping of an item, wherein the plurality of shipping options are ranked in a first ranking as a function of shipping option cost values determined for each of the shipping options from environmental impact costs, shipping price costs and time-to-delivery costs;

dynamically recalculate at least one of the plurality of shipping option determined cost values during the shipping of the item by the implemented highest ranked one of the first ranked plurality of shipping options;

update the ranking of the shipping options to generate a second ranking of the shipping options that is different from the first ranking in response to a change in value of at least one of the recalculated at least one shipping option cost values; and change the implemented selected shipping option during the shipping of the item from the highest ranked one of the first ranking to another of the plurality of shipping options that is ranked higher in the second ranking as a function of the updated ranking.

21. The programmable device of claim 20, wherein processing means is configured to:

notify a user of the change in value of the at least one of the determined shipping option cost values and of the updated second ranking of the presented plurality of shipping option; and enable the user to manually change the selected and implemented shipping option during the shipping of the item to the another of the plurality of shipping options presented in the updated second ranking through an input to the computer system.

22. The programmable device of claim 21, wherein processing means is configured to, update the ranking of the plurality of shipping options to generate the second ranking of the shipping options by:

providing for an extended time period for responses of shipping option cost values from shipping option entities after an initial calculation and return of the first ranking of the shipping options;

discovering during the extended time period that the another shipping option has newly available capacity for shipping the item;

determining that using the newly available capacity in the another shipping option results in a lower environmental impact cost for the shipping the item than using the selected and implemented shipping option; and ranking the another shipping option higher than the selected and implemented shipping option in the updated second ranking in response to determining the lowered environmental impact cost for the shipping the item using the newly available capacity.

23. The programmable device of claim 22, wherein processing means is configured to:

track a progression of the item through the selected and implemented shipping option;

determine changes to environmental impact costs relevant to shipping of the item in response to a change in fuel supply or a change in availability within a transport system of the selected and implemented shipping option;

inform the user of the determined changes to the environmental impact costs; and enable the user to retain the selected and implemented shipping option in response to the information of the determined changes to the environmental impact costs, instead of switching to the another option that is ranked higher in the second rankings.

24. The programmable device of claim 22, wherein processing means is configured to:

calculate a reward amount as a function of a weighting value of an indicated shipping preference environmental impact weighting or as a function of an environmental impact cost value of a one of the plurality of shipping options manually selected by the user; and provide the calculated reward amount to the user.

* * * * *